United States Patent Office 3,400,733
Patented Sept. 10, 1968

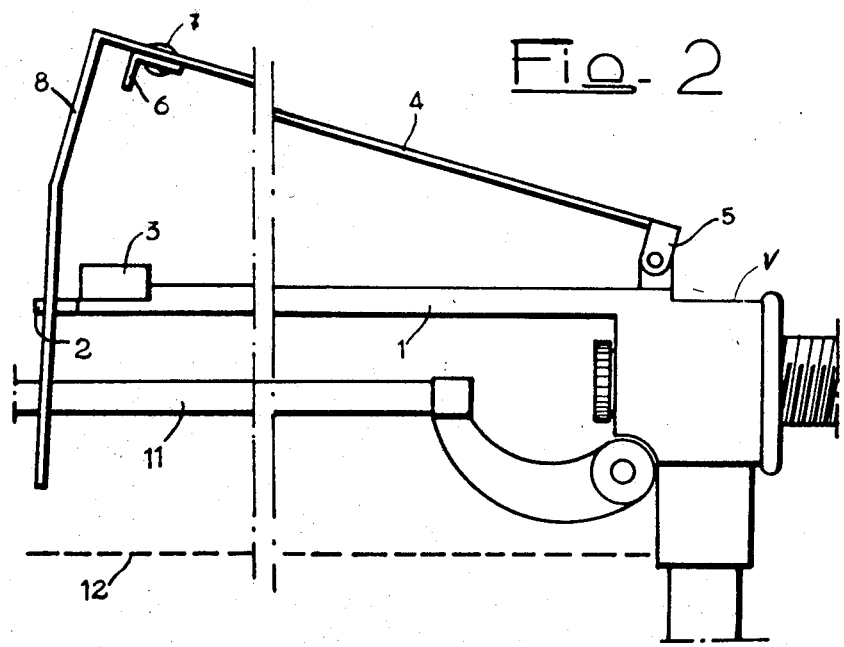
Fig. 2
Fig. 3
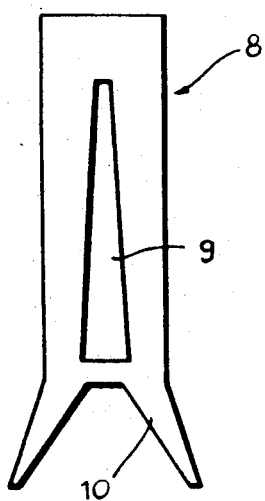

3,400,733
FLOAT-CONTROLLED HYDRAULIC VALVE
ARRANGEMENT
Giorgio Scoppola, Rome, Italy, assignor to Rubinetterie
Stella S.p.A., Novara, Italy
Filed June 16, 1966, Ser. No. 557,977
Claims priority, application Italy, June 22, 1965,
13,874/65
5 Claims. (Cl. 137—416)

The invention relates to float-controlled hydraulic valve arrangements, particularly suitable for supplying water to water closet flushing tanks.

In known valves of this kind a valve member is operatively connected with a lever so that, when the lever is lifted, the valve member closes a passage for water flow through a valve. The lever itself carries a float which, when water is supplied to the flushing tank, is lifted by the effects of hydrostatic thrust. The float thus follows the water level and eventually rises far enough to lift the lever sufficiently to effect closure of the valve.

Since the water level rises slowly as the flushing tank is filled, the valve is only gradually closed. In consequence the flushing tank filling period is very long in comparison with the period that would be required if the valve were wide open during the whole flushing tank filling operation.

It is an object of the present invention to provide a float-controlled hydraulic valve arrangement of the type referred to above, but which reduces the period of time required for filling a tank. This object is achieved by preventing the valve member from appreciably restricting the water flow through the valve until the tank is full.

A further object is to provide a float-controlled hydraulic valve arrangement, particularly for the control of a supply of water to a tank such as the tank of a water closet, the said arrangement comprising, a valve body incorporating a hydraulic valve for opening or closing a passage of water to the said tank and the said valve body having hinged thereto a lever active on the said valve and carrying a float, magnetic stop means being provided which are operable to exert forces on the said lever to maintain the valve open and the float in a submerged position until the said float has become sufficiently submerged for the hydrostatic forces active thereon to overcome the forces of the said stop means.

These and other objects and advantages of the invention will be clear from the following description, given with reference to the accompanying drawings which are by way of example and in which:

FIGURE 2 shows the valve of FIG. 1 in its closed position;

FIGURE 3 is a front view of a stop fork for a valve operating lever for the valve of FIGS. 1 and 2.

Figure 1:
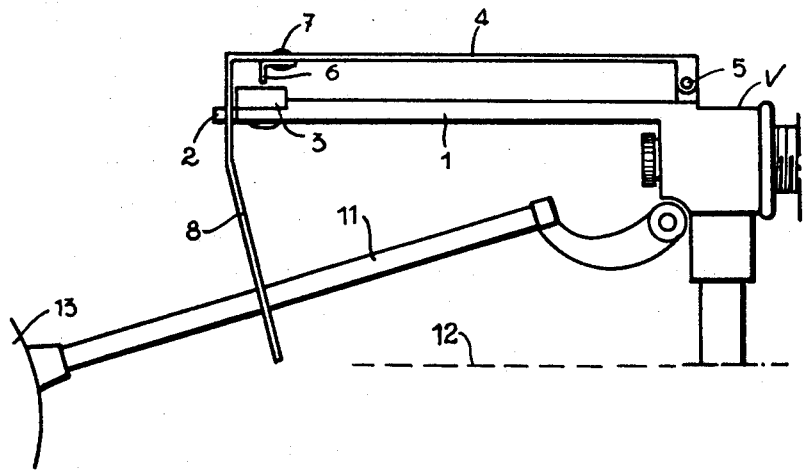
FIGURE 1 is a side elevational view of a valve arrangement according to the invention, the said valve being shown in its open position.

Referring to FIGS. 1 to 3, the valve shown comprises a bracket 1 integral with and extending from a valve body V. The said bracket 1 is provided at its free end with a tooth 2. The bracket 1 supports a permanent magnet 3 arranged on its upper face near the tooth 2. A rod 4 is provided on top of the bracket 1 and has one end connected, by a hinge 5 with a horizontal axis, to the valve body V. The rod 4 carries at its free end an L-shaped soft iron armature directed towards the bracket 1, the armature 6 being secured to the rod 4 by a rivet 7.

The extreme free end of the rod 4 is provided with a stop fork in the form of a downwardly turned extension 3 (FIG. 3) in which a vertical eyelet 9 is formed. The latter eyelet slidingly engages the tooth 2.

The rod 4 is movable about its hinge 5 and is guided on its swinging motions by interengagement of the tooth 2 and the eyelet 9. This guiding ensures that the armature 6 comes into contact with the magnet 3 when the rod is lowered. The lower end 10 of the extension 8 is fork-shaped, the fork limbs facing downwardly.

A valve operating float 13 is secured to one end of a lever 11, the other end of which lever is articulated to the valve body V. The lever 11 is operatively connected in a known, but unshown, manner with the valve member and is arranged below the bracket 1 and between the limbs of the fork-shaped end 10.

In FIGURES 1 and 2, the line 12 denotes the water level in the flushing tank.

When the said level 12 is at its lowest the float 13 is of course in its fully lowered position, the lever 11 being below the apex of the fork-shaped end 10. Under these conditions the lever 11 holds the operative part of the valve V away from its seat, such a condition allowing water to flow through the said valve and into the tank.

As the water level 12 rises, the float 13 follows its upward movement until the lever 11 reaches the apex of the fork-shaped end 10 (FIG. 1). Despite some further increase in the water level the lever 11 persists for a period of time in this position because of the natural attraction of the magnet 3 and the armature 6. The valve position consequently remains the same, the water flow therethrough holding constant.

However, as the water starts to submerge the float 13, the hydrostatic thrust acting on the said float increases until it overcomes the forces of attraction between the magnet 3 and the armature 6. At this stage the float 13 is suddenly lifted to the water level above it, moving the rod 4 suddenly upwards. At the same time the lever 11 is of course lifted together with the float 13 and this quickly closes the valve. The flow of water into the tank thus suddenly stops.

The attraction between the armature 6 and magnet 3 is suitably adjusted during manufacture by considered proportioning of both the magnet 3 and armature 6.

Figure 4:
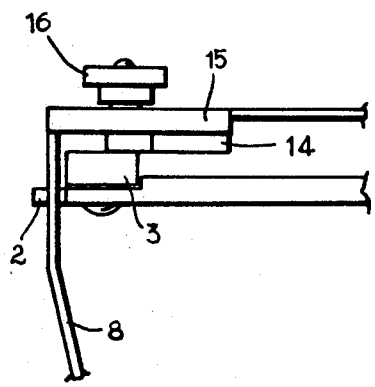
FIGURE 4 is a detail view of a part of a modified valve embodiment.

When various and variable performances are required, however, a soft iron armature 14 is utilized (FIG. 4). This armature is of box shape and has a planar surface for contact with the magnet 3. The said armature is arranged to be displaceably mounted in a guide 15 secured to the rod 4 so that, on varying the position of the armature, the extent of its contact surface with the magnet 3 can be varied. This variation adjusts the degree of attraction between the armature 14 and the magnet 3.

When the correct position for a particular use is reached the armature 14 is fixed with respect to the guide 15 by means of a screw arrangement 16.

What I claim is:

1. A float-controlled hydraulic valve arrangement, particularly for the control of a supply of water to a tank such as the tank of a water closet, the said arrangement comprising:
   (A) A valve body incorporating a hydraulic valve for opening and closing a passage of water to the said tank,
   (B) a lever,
   (C) a float, and
   (D) magnet stop means,
the said lever pivoted at one end to the said valve body and carrying at its other end the said float, the said float being arranged to float in the water tank and the said lever being operative by control the hydraulic valve in the valve body to which it is hinged, the said magnetic stop means being mounted to be operatively engageable with the said lever so as to exert on the said lever a force which tends to maintain the said valve open and the said float in a submerged position until the said float has sufficiently submerged for the hydrostatic forces active thereon to overcome the stop forces exerted by the said stop means on the said lever.

2. An arrangement according to claim 1 wherein the said stop means comprises a permanent magnet, a rod rigid with the said valve body, a rod hinged to the said valve body above the said rigid rod, a soft-iron armature and a guide extension member, the said permanent magnet being mounted on the said rigid rod and the said armature being so mounted on the said hinged rod as to be co-operable with the said magnet, the said extension member being rigid with the said hinged rod and operable to guide the said lever and to transmit stop forces thereto.

3. An arrangement according to claim 2 wherein the said extension member is provided with a slot to receive an end of the said rigid rod and a notch to receive the said lever.

4. An arrangement according to claim 3 wherein the said guide extension is fork-shaped, the limbs of the said fork being turned downwardly and situated each on one side of the said lever.

5. An arrangement according to claim 4 wherein the said armature is mounted movably with respect to the said hinged rod so that the extent of contact between a planar surface of the said armature and the said permanent magnet may be varied at will.

References Cited
UNITED STATES PATENTS

| | | | |
|---|---|---|---|
| 1,894,367 | 1/1933 | Corcoran | 137—416 X |
| 2,494,395 | 1/1950 | Landon | 251—65 X |

WILLIAM F. O'DEA, *Primary Examiner.*

D. R. MATTHEWS, *Assistant Examiner.*